United States Patent Office 3,470,441
Patented Sept. 30, 1969

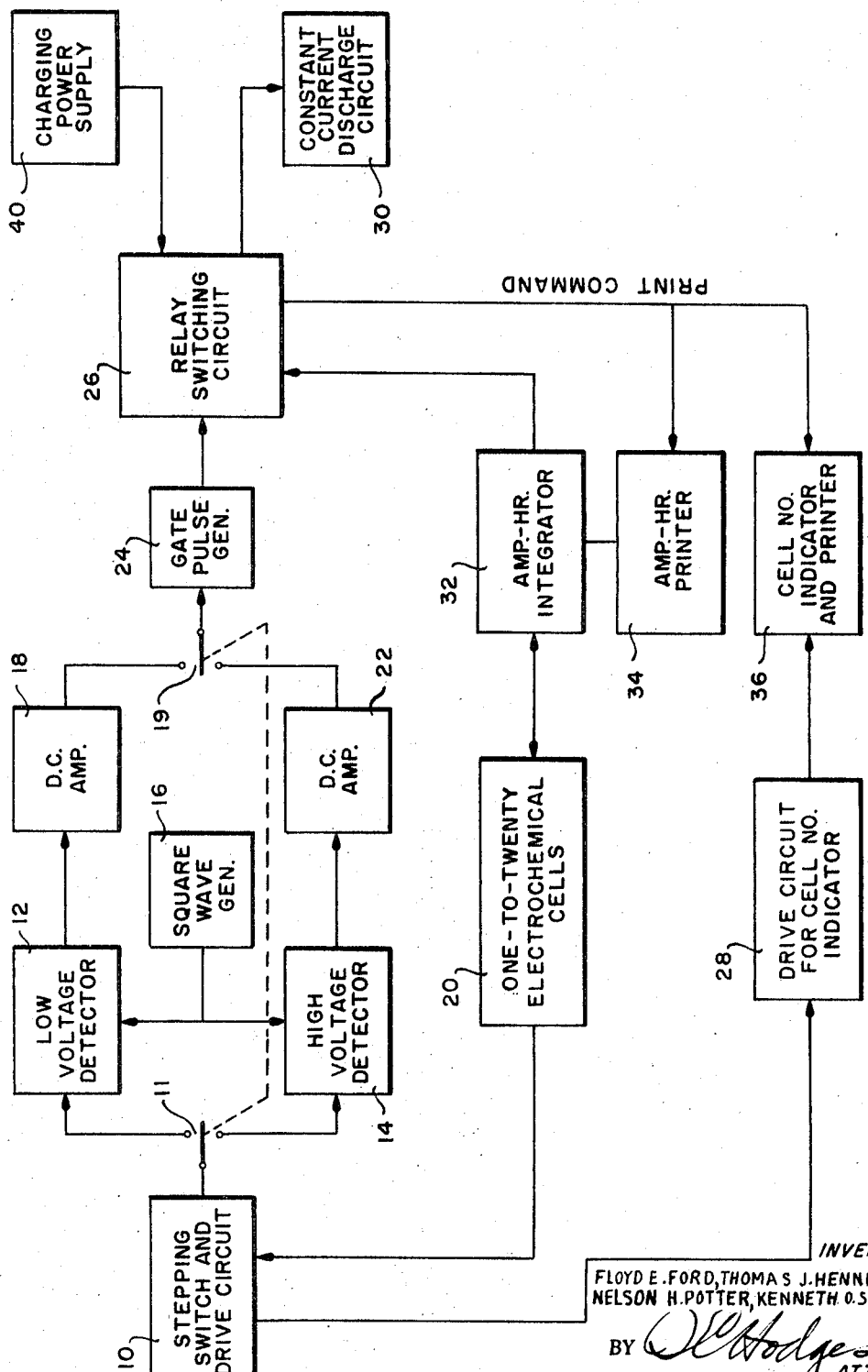

3,470,441
AUTOMATIC FORMATION CYCLER AND CONTROLLER FOR ELECTROCHEMICAL CELLS
Floyd E. Ford, Davidsonville, Thomas J. Hennigan, Chillum Terrace, Nelson H. Potter, Berwyn Heights, Md., and Kenneth O. Sizemore, Washington, D.C., assignors to the United States of America as represented by the Secretary of the Navy
Filed Oct. 25, 1966, Ser. No. 589,469
Int. Cl. H02j 7/14; H01m 45/04
U.S. Cl. 320—6                      3 Claims

ABSTRACT OF THE DISCLOSURE

This invention is a battery charger for charging and discharging a plurality of battery cells. The device operates to sense a high voltage in any given when the cells are being charged and a low voltage when they are being discharged. When either state is sensed, a pulse is generated to energize a relay which acts to remove the cell from the circuit.

---

The invention described herein may be manufactured and used by or for the Government of the United States of America for governmental purposes without the payment of any royalties thereon or therefor.

This invention relates to battery testing systems for measuring and indicating the capacity of the cells in a battery charging/discharging system.

Whenever electrochemical cells are to be used in an environment requiring maximum reliability such as in satellite power supplies, a series of tests are conducted to insure adequate performance. Typically, such tests involve charging the cells at a constant rate until a predetermined level is reached which is indicative of a full state-of-charge and that the cells are approaching the gaseous overpotential region. In addition, the cells are subjected to a discharging test which comprises discharging the cells at a constant current until a predetermined low terminal voltage is reached.

Previous techniques for testing cells were cumbersome and unreliable. Generally they involved charging and discharging a group of cells connected in series and observing the terminal voltage of each cell with a voltmeter. When the terminal voltage reached the predetermined value, it was manually switched from the charge flow path and the ampere-hour capacity of the cell computed. In the discharge mode, the cell was switched from the charge flow path and maintained under a constant current discharge condition as the terminal voltage of the cells decreased. This required manual adjustment of the load as the cell potential varied. Consequently, careful laboratory observation was necessary with the increased likelihood for gross error to be introduced into the testing procedure.

The present invention provides a system for automatically evaluating electrochemical cells by sensing the individual terminal voltages of the cells comprising the battery and automatically switching a cell from the charge flow path when a predetermined terminal voltage is reached. Upon switching the cell from the path, a command signal is provided for operating an ampere-hour capacity meter, cell identification number printer and event recorder. Similarly, in the discharge mode, a cell which reaches a predetermined low voltage is removed from the discharge flow path while the remaining cells in the battery are discharged at the same constant current rate.

Accordingly, it is an object of this invention to provide an automatic system for evaluating the performance of electrochemical cells.

Another object of this invention is to provide a system for charging each of the cells in a battery to a uniform level of capacity.

A further object of this invention is to provide means for discharging the cells in a battery to a uniform level.

A still further object of the invention is to provide apparatus for deriving constant current from a battery of cells which is independent of the contribution of the individual cells comprising the battery.

Other objects and advantages will become apparent from the specification and drawing in which the sole figure shows a block diagram representation of the invention.

Referring now to the drawing, a battery 20 comprises a series of cells which, in this preferred embodiment, may number from one to twenty. Each of the cells in battery 20 is connected to the terminals of a stepping switch 10. The output of stepping switch 10 is connected to a single-pole double-throw switch 11 as well as to the input of the cell number indicator drive circuit 28.

Switch 11 is employed to place the system in either the charge or discharge mode of operation. In the charge mode, the output of stepping switch 10 is connected to the input of a high voltage detector 14 and thence to a D.C. amplifier 22. In the discharge mode, a low voltage detector 12 and D.C. amplifier 18 are connected to the output of stepping switch 10. A double-pole double-throw switch 19 is ganged with switch 11 so that the respective detector circuit is connected to the input of a gate pulse generator 24. A square wave generator 16 is connected to detectors 12 and 14.

Gate pulse generator 24 is connected to a relay switching circuit 26 which connects either the charging power supply 40 or the constant current discharge circuit 30 to the circuit depending on whether the charge or discharge mode is selected. The relay switching circuit is also connected to the inputs of the ampere-hour printer 34 and cell number indicator and printer 36. An ampere-hour integrator 32 is connected to battery 20, printer 34 and the relay switching circuit 26.

In operation, the square wave generator 16, which may be a conventional multivibrator circuit, produces a positive square wave with respect to ground, which is fed to high voltage detector 14 and low voltage detector 12 and provides a sampling signal to the same.

Detectors 12 and 14 are of the type which exhibit a varying impendance in response to a changing input voltage. For instance, the detector disclosed in application Ser. No. 550,090 filed May 11, 1966, entitled "Charge Current Controller for Sealed Electro-chemical Cells with Control Electrodes" may be advantageously utilized in this system. As the input voltage from a particular cell in battery 20 varies in accordance with the charge or discharge mode, the impedance of detector 12 or 14 will also vary. As the detector impedance varies the amount of current which flows from square wave generator 16 will change therewith thus correlating the state-of-charge of the particular cell. The varying output of the detector is rectified and fed to a D.C. amplifier which amplifies the signal for use by gate pulse generator 24.

The gate pulse generator 24 is essentially a timing oscillator which is gated on by the output from the respective D.C. amplifier. As an example, a unijunction transistor circuit with the input fed to the emitter electrode may be employed for this function. When the pulse generator 24 is gated on by the input a pulse appears on the output which is fed to the relay switching circuit 26.

The relay switching circuit 26 may comprise either electromechanical or electronic components responsive to the output of the pulse generator 24. The pulse output from generator 24 causes switching circuit 26 to remove the particular cell being monitored from the charge (or discharge) flow path.

In the case of the discharge mode, as the particular cell being monitored is switched from the discharge flow path, the current being supplied by the remaining cells in the battery will remain constant through the action of the constant current discharge circuit 30. The constant current discharge circuit 30 is essentially a device, the impedance of which varies in accordance with the total terminal voltage of the cells in battery 20. For instance, the circuit disclosed in application Ser. No. 576,799 filed Aug. 31, 1966 entitled "constant Current Sink Curcuit" may be advantageously utilized for this purpose.

As a particular cell is switched from the charge flow path, the relay switching circuit 26 initiates a print command to the ampere-hour printer 34 and the cell number indicator and printer 36. Printers 34 and 36 furnish a written digital record of the particular cell number along with its capacity measured in ampere hours by the integrator circuit 32 connected to the cell. Integrator circuit 32 furnishes the cell capacity by measuring the current flow over an interval of time and integrating. As stepping switch 10 moves from one monitored cell to another, a signal is sent to the cell number indicator drive circuit 28 which causes printer 36 to advance the count one digit for identifying the new cell.

This process is completed until each of the cells in battery 20 has been monitored in either the charge or discharge mode or both. The printed-out digital record may then be used to select the cells which promise optimum reliability and capacity. The invention, being entirely automatic in operation, obviates the need for continuous supervision with the consequent chance for error in testing cells.

Having thus described the invention, it will be obvious that numerous modifications and additions will become apparent to those skilled in the art.

What is claimed is:

1. A system for capacity testing each of a plurality of battery cells for charge and discharge comprising:
   a low voltage detection path having input and output terminals comprising a low voltage detector and an amplifier therefor for detecting discharge;
   a high voltage detection path having input and output terminals and oriented in parallel with said low voltage detection path and comprising a high voltage detector and an amplifier therefor for detecting charge;
   first switch means having an input terminal and an output arm for contracting either one of the input terminatls of said detection paths;
   said switch means gauged to said first switch means having an output terminal and an input arm for contacting either one of the output terminals of said detection paths;
   a source of sampling pulses connected to the high and low level detectors;
   a stepping switch connected to the battery cells and to the input terminal of siad first switch means;
   current flow means for causing a flow of current through the battery cells to charge and discharge said cells;
   gate pulse generator means connected to the output arm of said second switch means for producing an output pulse in response to a predetermined voltage level attained by a particular cell connected to the stepping switch and detected in one of said detection paths; and
   relay switching means connected to the gate pulse generator means and to said current flow means for removing in response to an output pulse from said gate pulse generator means the particular cell then being monitored for change or discharge.

2. The system according to claim 1 but further comprising means connected to said stepping switch and to said relay switching means for identifying particular cells of the battery.

3. A system for capacity testing of electrochemical cells comprising:
   a battery of cells;
   detector means responsive to the voltage potential of said cells, said detector means being responsive to voltage potentials of a range associated with said particular cell being in a state of discharge;
   means for connecting a particular cell of said battery to said detector means;
   means for discharging the battery at a constant rate of current; and
   means for removing said particular cell from the flow of current thru said battery in response to said detector measuring a predetermined terminal voltage.

References Cited

UNITED STATES PATENTS

| | | | |
|---|---|---|---|
| 3,413,536 | 11/1968 | Webb | 320—40X |
| 2,467,347 | 4/1949 | Trucksess | 323—15 |
| 3,271,652 | 9/1966 | Walz et al. | 320—44 |
| 3,278,824 | 10/1966 | Runyon | 320—48X |
| 3,305,754 | 2/1967 | Oaks et al. | 320—48X |

JOHN F. COUCH, Primary Examiner

STANLEY WEINBERG, Assistant Examiner

320—18, 40